(12) United States Patent
Kim et al.

(10) Patent No.: US 11,535,536 B2
(45) Date of Patent: Dec. 27, 2022

(54) SERVER OF MONITORING WATER PURIFICATION APPARATUS ACCORDING TO VOICE COMMAND AND WATER PURIFICATION APPARATUS

(71) Applicant: LG ELECTRONICS INC., Seoul (KR)

(72) Inventors: Sang Won Kim, Seoul (KR); Jae Hoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 681 days.

(21) Appl. No.: 16/489,570

(22) PCT Filed: Mar. 26, 2019

(86) PCT No.: PCT/KR2019/003510
§ 371 (c)(1),
(2) Date: Aug. 28, 2019

(87) PCT Pub. No.: WO2020/196942
PCT Pub. Date: Oct. 1, 2020

(65) Prior Publication Data
US 2021/0355003 A1    Nov. 18, 2021

(51) Int. Cl.
*G10L 15/22*    (2006.01)
*C02F 1/52*    (2006.01)
(52) U.S. Cl.
CPC ............ *C02F 1/5209* (2013.01); *G10L 15/22* (2013.01); *G10L 2015/223* (2013.01)

(58) Field of Classification Search
CPC ... C02F 1/5209; G10L 15/22; G10L 2015/223
See application file for complete search history.

(56) References Cited

U.S. PATENT DOCUMENTS

| 8,505,593 | B1 | 8/2013 | Denise | |
| 2013/0043304 | A1* | 2/2013 | Agon | A47J 31/521 |
| | | | | 235/381 |
| 2013/0085600 | A1 | 4/2013 | Nicol et al. | |
| 2019/0069728 | A1* | 3/2019 | Alfarra | A23N 12/02 |

FOREIGN PATENT DOCUMENTS

| KR | 1020120097630 | | 9/2012 | |
| KR | 20160019847 | A * | 2/2016 | ............. G06Q 50/22 |
| KR | 1020160019847 | | 2/2016 | |

OTHER PUBLICATIONS

PCT International Application No. PCT/KR2019/003510, International Search Report dated Dec. 24, 2019, 3 pages.

* cited by examiner

*Primary Examiner* — Robert J Michaud
(74) *Attorney, Agent, or Firm* — Lee, Hong, Degerman, Kang & Waimey PC

(57) ABSTRACT

A server that monitors a water purification apparatus according to a voice command and the water purification apparatus are provided, and according to an embodiment of the present disclosure, the server that monitors the water purification apparatus according to the voice command includes a voice processor that receives the voice command from the water purification apparatus and identifies a user who issues the voice command.

11 Claims, 9 Drawing Sheets

SERVER OF MONITORING WATER PURIFICATION APPARATUS ACCORDING TO VOICE COMMAND AND WATER PURIFICATION APPARATUS

CROSS-REFERENCE TO RELATED APPLICATIONS

This application is the National Stage filing under 35 U.S.C. 371 of International Application No. PCT/KR2019/003510, filed on Mar. 26, 2019, the contents of which are hereby incorporated by reference herein in its entirety.

TECHNICAL FIELD

A server that monitors a water purification apparatus according to a voice command and the water purification apparatus are disclosed herein.

BACKGROUND ART

Drinking water supply apparatus may supply drinking water to users. The drinking water supply apparatus may be an independent apparatus and may be included in a portion of another apparatus.

An apparatus, commonly referred to as "a drinking water supply apparatus" or "a water purifier", may receive water from the outside and may purify the water to provide the water having a predetermined temperature to users. In related art, the water purifier may perform a function for purifying the water and controlling the temperature of water.

Recently, various types of home appliances may perform communication functions and computing functions, and home appliances may require functions of artificial intelligence. A technology in combination of communication functions may be suggested for TVs, air conditioners, air purifiers, to control the TVs, the air conditioners, the air purifiers from outside and determine a usage state of the TVs, the air conditioners, the air purifiers.

Meanwhile, in the case of the water purifier, as patterns of drinking water are different for each individual, it has been requested to provide a personalized service in combination of the communication function and the computing function. Accordingly, the present disclosure provides the personalized service with respect to the water purifier.

DISCLOSURE

Technical Problem

In order to solve the above-mentioned problems, according to the present disclosure, a user who uses a water purification apparatus may be identified through voice.

According to the present disclosure, an object of using the water purification apparatus may be identified, to control the water purification apparatus.

According to the present disclosure, a cumulative amount in which the water purification apparatus is used is checked and the user is guided through the water purification apparatus.

The objects of the present disclosure are not limited to the above-mentioned objects, and other objects and advantages of the present disclosure which are not mentioned above may be understood by the following description, and will be more clearly understood by the embodiments of the present disclosure. It will also be readily apparent that the objects and advantages of the present disclosure may be implemented by features defined in claims and a combination thereof.

Technical Solution

According to an embodiment of the present disclosure, a server that monitors a water purification apparatus according to a voice command may include a voice processor that receives the voice command from the water purification apparatus and identifies a user who issues the voice command.

According to an embodiment of the present disclosure, the server that monitors the water purification apparatus according to the voice command may include a control processor that receives the information on discharged water from the water purification apparatus and matches the identified user and stores the information on discharged water and the information on identification of the user together.

According to an embodiment of the present disclosure, the server that monitors the water purification apparatus according to the voice command may include a voice processor that receives the voice command from the water purification apparatus, and extracts, from the voice command, the information on identification of the user, query information, and information on object of discharged water.

According to an embodiment of the present disclosure, the server that monitors the water purification apparatus according to the voice command may include a voice processor that extracts information on feature of voice from an audio file and stores the information on the feature of the voice together with the information on identification of the user.

According to an embodiment of the present disclosure, the server that monitors the water purification apparatus according to the voice command may include a control processor that stores the information on identification of the user and the information on the discharged water, and the information on the object of the discharged water, when the server compares the information on the discharged water and the information on the object of the discharged water, and the control processor determines same usage from the compared information.

According to an embodiment of the present disclosure, the server that monitors the water purification apparatus according to the voice command may include the control processor that extracts the information on use of discharged water corresponding to the query information and provides the information on use of the discharged water to the water purification apparatus or the voice processor.

According to an embodiment of the present disclosure, the water purification apparatus that operates according to the voice command may include a controller that controls a water purification module according to the control command received from the server.

Advantageous Effects

When embodiments of the present disclosure are applied, a voice processor of a server may identify a user through voice according to voice command input to a water purification apparatus.

When embodiments of the present disclosure are applied, the server may identify an object of using a water purification apparatus according to the voice command and may control the water purification apparatus.

When embodiments of the present disclosure are applied, it is possible to provide a safe water purification apparatus by controlling a temperature of discharged water and an amount of discharged water, which are suitable for the identified user.

The effects of the present disclosure are not limited to the above effects, and those skilled in the art may easily obtain various effects of the present disclosure based on configurations of the present disclosure.

DETAILED DESCRIPTIONS

Figure 1:
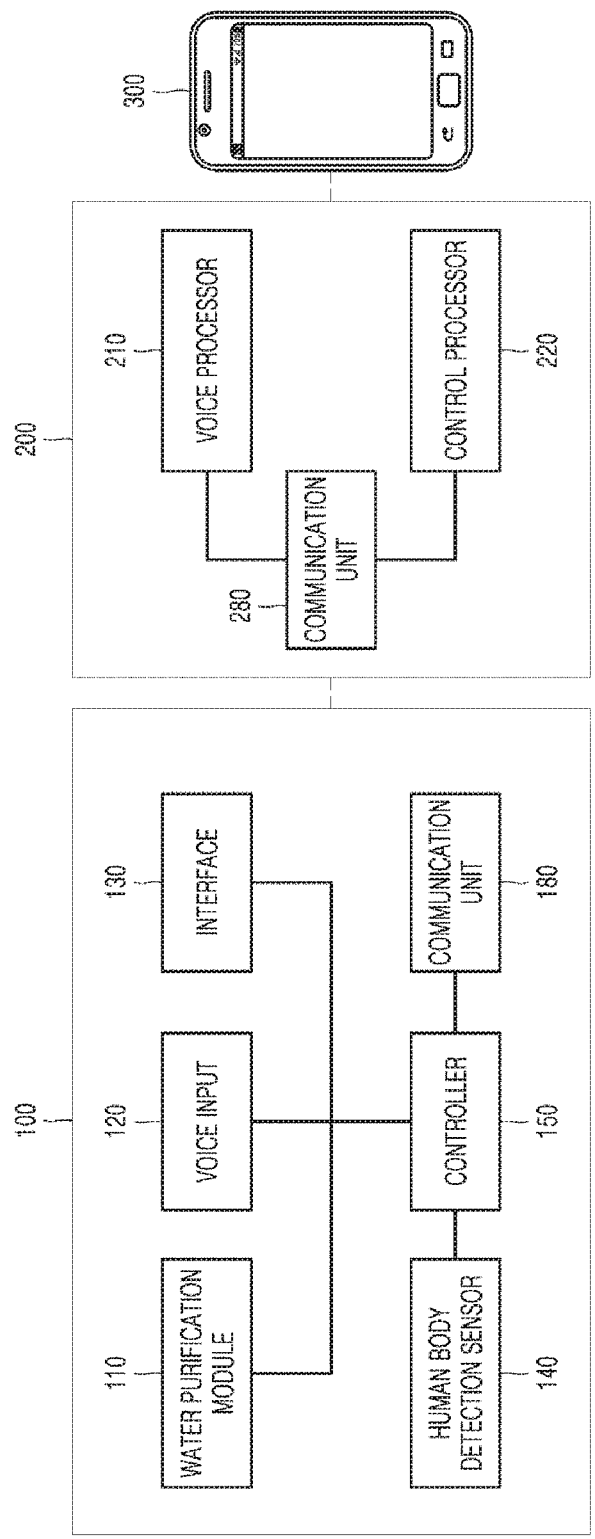
FIGS. 1 and 2 show logical configurations of water purification apparatuses and servers that operate with the water purification apparatuses.

Hereinafter, embodiments of the present disclosure will be described in detail with reference to the drawings so that those skilled in the art to which the present disclosure pertains may easily implement the present disclosure. The present disclosure may be implemented in many different manners and is not limited to the embodiments described herein.

In order to clearly illustrate the present disclosure, technical explanation that is not directly related to the invention may be omitted, and same or similar components are denoted by a same reference numeral throughout the present disclosure. Further, some embodiments of the present disclosure will be described in detail with reference to the exemplary drawings. In adding reference numerals to components of each drawing, the same components may have the same reference numeral as possible even if they are displayed on different drawings. Further, in describing the present disclosure, a detailed description of related known configurations and functions will be omitted when it is determined that it may obscure the gist of the present disclosure.

In describing components of the present disclosure, it is possible to use the terms such as first, second, A, B, (a), and (b), etc. These terms are only intended to distinguish a component from another component, and a nature, an order, a sequence, or the number of the corresponding components are not limited by that term. When a component is described as being "connected", "coupled", or "connected" to another component, the component may be directly connected or able to be connected to the other component; however, it is also to be understood that an additional component may be "interposed" between the two components, or the two components may be "connected", "coupled" or "connected" through an additional component.

Further, with respect to implementation of the present disclosure, the present disclosure may be described by subdividing an individual component, the components of the present disclosure may be implemented within a apparatus or a module, or a component of the present disclosure may be implemented by being divided into a plurality of apparatuses or modules.

In the present disclosure, all types of apparatuses that provide edible water are referred to as "water purification apparatuses". Accordingly, a refrigerator including a dispenser that receives water from the outside and purifies the water and provides the purified water as edible water is referred to as "a water purification apparatus' in the present disclosure. Further, a water purifier which is an independent product corresponds to the water purification apparatus in the present disclosure. Thus, an apparatus of providing the edible water is referred to as 'the water purifier' in the present disclosure.

Figure 2:
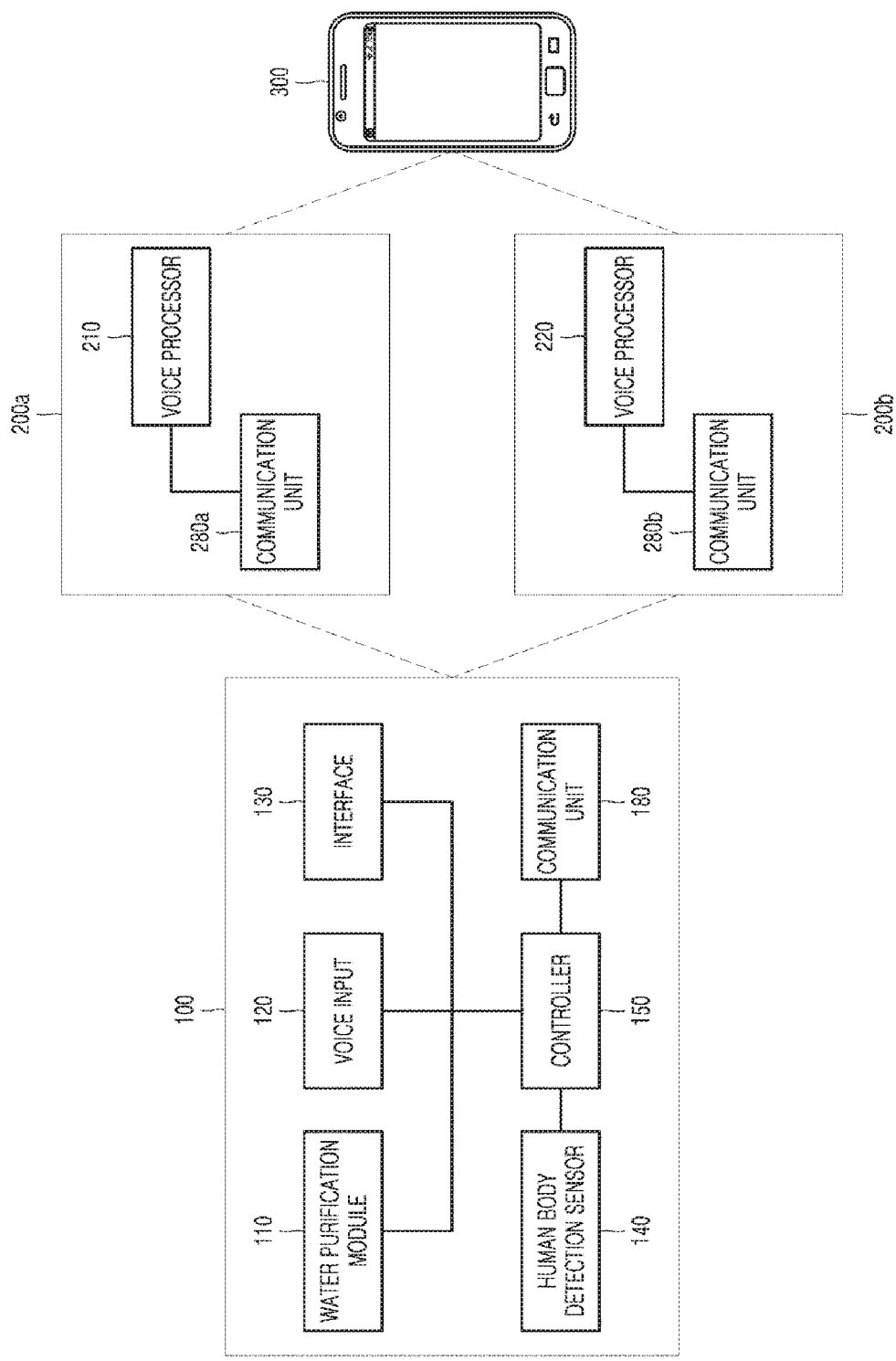

FIGS. 1 and 2 show logical configurations of water purification apparatuses and servers that operate with the water purification apparatus. FIG. 1 will be mainly described.

A water purification apparatus 100 and a server 200 exchange information through communication. The server 200 and a portable terminal 300 exchange information through communication.

The configuration of the water purification apparatus 100 will be described in more detail. A water purification module 110 discharges water. The water purification module 110 may further include a button that may be used to request hot water/cold water/purified water. Further, the water purification module 110 includes a dispenser that adjusts an amount of discharged water. The water purification module 110 may include various types of operation buttons to discharge water having various kinds of temperatures. A user may slightly adjust the temperature through buttons or dials.

Further, the speech input 120 that receives voice of the user is provided on a front surface of the water purification apparatus 100. An embodiment of the voice input 120 is microphone. An interface 130 may output an audio file or text through voice. Further, the interface 130 includes buttons and dials that may be used to operate the water purification apparatus 100, by the user.

A communication unit 180 transmits and receives data to and from the server and transmits, to the server, information on water discharged by the water purification module 100. The information on discharged water includes an amount of discharged water, a temperature or kinds of discharged water, after the water is discharged. Further, the information on the discharged water includes information on time at which the water discharge starts and information on time at which the water discharge is finished.

A human body detection sensor 140 detects a movement of a person in front of the water purification apparatus 100. In particular, when the user inputs a voice command and leaves that place without discharging the water, the human body detection sensor 140 detects the movement of the user, and the communication unit 180 transmits, to the server 200, information on the movement state of the user.

The controller 150 controls a water purification module according to the control command received from the server. The control command may be used to control any one of the temperature of discharged water or an amount of discharged water. As shown in FIG. 1, the water purification apparatus 100 operates according to the voice command.

Further, the controller 150 may process a simple voice command. For example, when words such as "suspending" and "stop" are input to the interface 130 during discharge of water, the controller 150 stops the discharging of the water, which is performed by the water purification module 110.

The server 200 has two kinds of configurations. According to an embodiment of the present disclosure, a voice processor 210 and a control processor 220 are included in one server 200 as shown in FIG. 1.

As shown in FIG. 2, according to another embodiment of the present disclosure, the voice processor 210 and the control processor 220 are independent components, respectively. The voice processor 210 is included in the voice server 200a and the control processor 220 is included in the control server 200b. The two servers 200a and 200b may operate as respective apparatuses. In this case, the voice processor 210 included in the voice server 200a, and the control processor 220 included in the control server 200b, may transmit and receive information to and from communications 280a and 280b.

The voice processor 210 receives a voice command from the water purification apparatus 100 and identifies a user who issues the voice command. The control processor 220 receives the information on the discharged water from the water purification apparatus 100. The control processor 220 matches information on the user identified by the voice processor 210 to the information on discharged water and stores the information on discharged water and the information on identification of the user together.

The communication unit 280 transmits and receives data to and from the water purification apparatus 100. The communication unit 280 transmits the received data to the voice processor 210 or the control processor 220 according to the kinds of the received data.

When the voice processor 210 and the control processor 220 are included in servers, respectively, the server including the voice processor 210 may include one communication, and the server including the control processor 220 may include another communication.

The voice processor 210 receives a voice command from the water purification apparatus 100, and extracts information on identification of the user, query information or information on object of discharged water, from the voice command. The speech processor 210 extracts, when words (mom, dad, Yeong-hee, grandmother) indicating users are included in the voice command, extract these words and determine the information on identification of the user.

The query information includes information on querying information on an amount of drinking water of a specific user or querying an amount of discharged water or a temperature of discharged water of the water purification apparatus 100 for a specific period of time.

Information on an object of discharged water includes the object of using the water discharged by the user. The voice processor 210 extracts, from the voice command, words such as coffee, cooking, and ramen, or temperature information such as cold water and hot water.

The voice processor 210 may identify the user, using the feature of voice. For example, the voice processor 210 receives information on identification of the user or the audio file from the water purification apparatus 100 or the mobile terminal 300. For example, the speech processor 210 receives the audio file of "Daddy", information on "Daddy" that the user speaks, information on "Young-hee", and the audio file of a certain word.

The voice processor 210 extracts the information on the feature of voice from the audio file and stores the information on the feature of the voice together with the information on identification of the user. The information on the feature of voice is required to distinguish the users through voice, for example, a tone, frequency, pronunciation, and speed of voice.

In embodiments related to FIGS. 1 and 2, the water purification apparatus 100 and the server 200 identify the usage information (information on an object of discharged water, information on identification of a user, query information) of the water purification apparatus 100 by performing a function for recognizing voice. The server 200 may provide the water purification apparatus 100, with the audio file, to output identified information on using to the user, through voice. Further, the server 200 may transmit the information on a cumulative amount used, to the portable terminal 300 and may determine a usage state of the water purification apparatus 100 through the portable terminal 300, even at the outside.

The usage information includes information on family members (information on identification of the user) who use the water purification apparatus 100, a temperature or an amount of water consumed by each member, and a drinking object (information on an object of discharged water).

The server 200 may transmit various kinds of information related to drinking water to the water purification apparatus 100 or the mobile terminal 300 so that the user may check the information on an amount of drinking of water for each family member and for the object of drinking water through voice guidance or an app.

In other words, the user may accurately determine the object and an amount of drinking water of the user and the family members, in real time. The information on the object of drinking water includes coffee, cooking, and ramen. Further, the information on the object of drinking water includes the hot water, the cold water, and the purified water.

Figure 3:
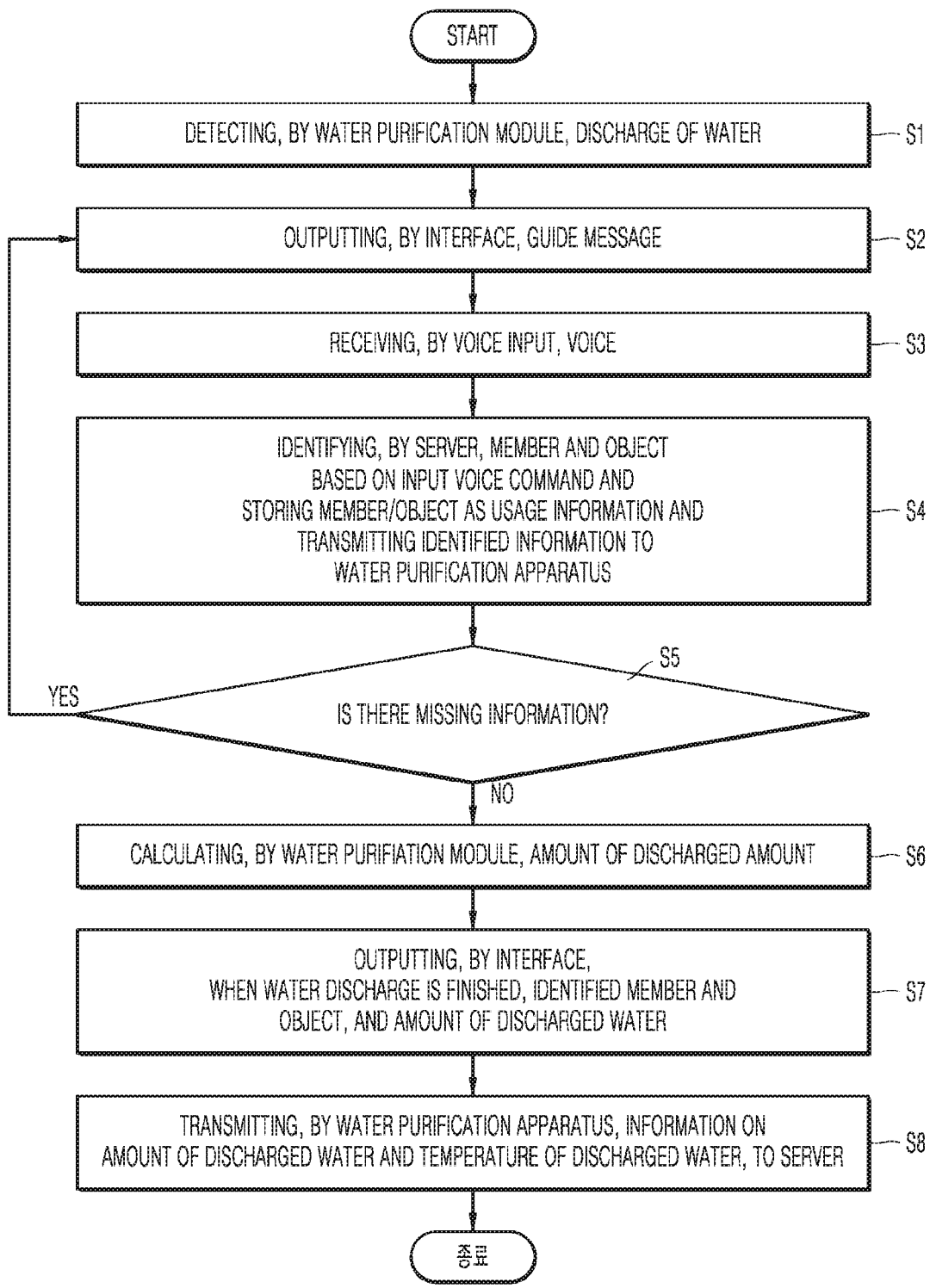
FIG. 3 shows a process of using a water purification apparatus according to an embodiment of the present disclosure.

FIG. 3 shows a process of using a water purification apparatus according to an embodiment of the present disclosure.

A water purification module 110 detects discharge of water (S1). An interface 130 outputs a guidance message (S2). For example, the interface 130 outputs a message inquiring family member and an object of drinking water, for example "Who is it?" or "How are you going to drink?".

Thereafter, when the user speaks information on identification of the user and information on the object, the voice input 120 receives a voice (S3). The voice command received by the voice input 120 is transmitted to the server 200 based on the control of the communication unit 180.

The server 200 extracts the member (information on identification of the user) and the information on an object of discharged water from the received voice command and stores them as usage information. Then, the extracted information is transmitted to the water purification apparatus (S4).

In this process, when there is missing information (the member or the object), the water purification apparatus 100 may proceed to S2 again (S5). Alternatively, the water purification apparatus 100 may proceed to S6 even if there is missing information.

That is, the voice processor 220 of the server 200 may instruct the water purification apparatus 100 to output the guidance message to request inputting the information on identification of the user, when the information on identification of the user is missing from the voice command. The water purification apparatus 100 outputs a guide message as described in S2.

Of course, when there is no missing information, the water purification apparatus 100 proceeds to S6. The water purification module 110 of the water purification apparatus 100 calculates the amount of discharged water (S6). When the water discharge is completed, the interface outputs information on use including the identified member and object identified in S3 and S4 and the amount of discharged water (S7).

For example, the water purification apparatus 100 may output the received information through voice. For example, in S3, "Grandmother drinks hot coffee" is input, the water purification apparatus 100 may output the guidance message of "Grandmother uses 130 ml of hot water for coffee" in S7. The water purification apparatus 100 transmits the information on the amount of discharged water and the temperature of the discharged water to the server 200 in S8.

The server 200 may enable the received information to be included in the usage information and may update and store the information. In this process, the usage information may include the information on a period of time for which it is used and may be stored. The server 200 may use the information on usage, which is stored to infer the user when the user may not perform the voice input to identify the user.

Figure 4:
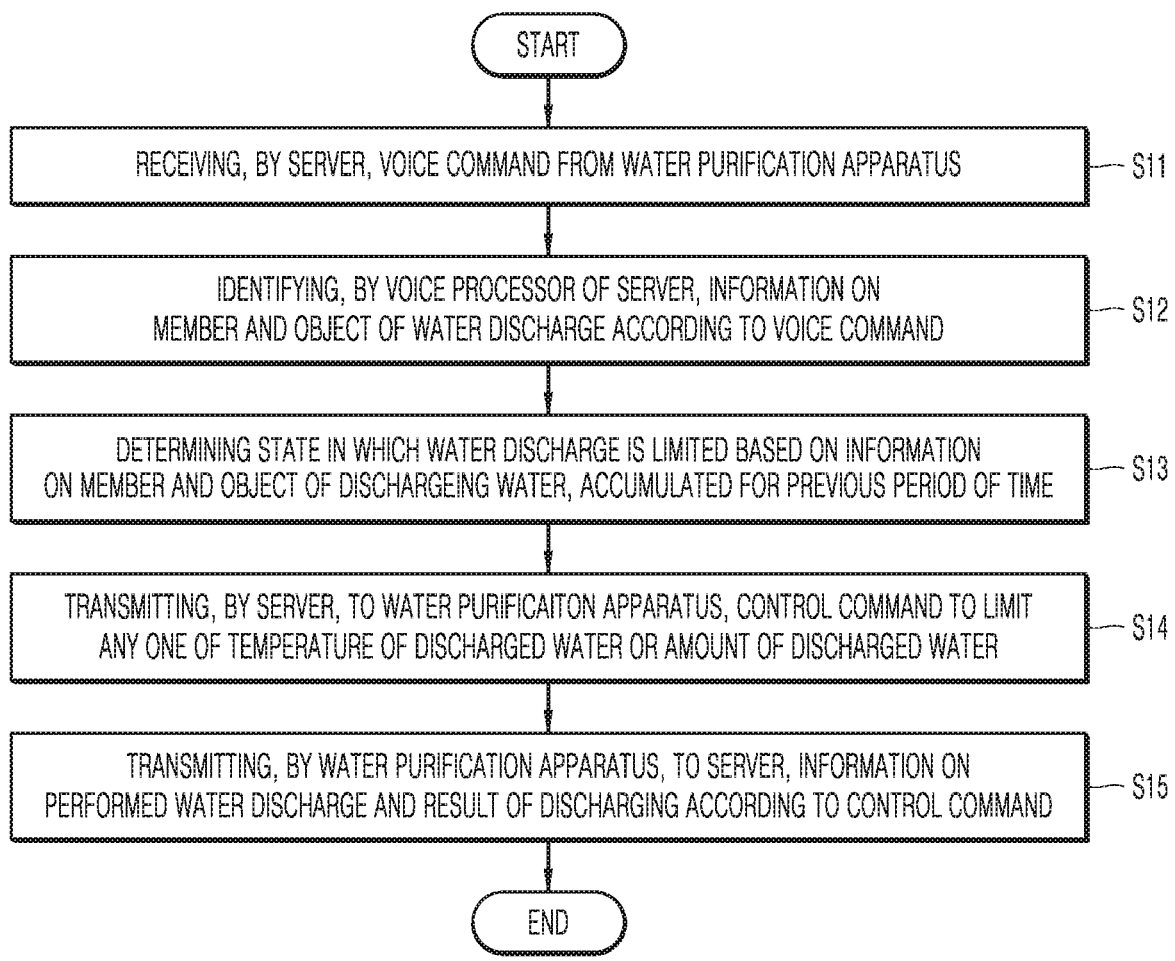
FIG. 4 shows a process of controlling, by a server, a water purification apparatus according to an embodiment of the present disclosure.

FIG. 4 shows a process of controlling a water purification apparatus of a server according to an embodiment of the present disclosure.

A server 200 receives a voice command from a water purification apparatus (S11). A voice processor 210 of a server 200 identifies members (information on identification of the user) and information on an object of discharged water, according to the voice command (S12). Further, the server 200 determines a state in which the water discharge is limited, based on accumulated information of member for a previous period of time and information on an object of discharged water (S13).

For example, when a member of a young age group or an older age group already drank a lot of ice water, the server 200 may limit the discharge of ice water. Further, the member of young age/older age is identified, for safety, the server 200 may control the temperature of discharged hot water or an amount of discharged hot water, or a speed of discharged hot water.

Then, the server 200 transmits, to the water purification apparatus 100, a control command to control at least one of the temperature of discharged water or the amount of discharged water (S14). The water purification apparatus 100 performs discharging water according to the control command and transmits the result of discharged water to the server 200 (S15). In this process, the interface of the water purification apparatus 100 may notify the user of a state in which the water discharge is limited through voice guidance or text guidance.

For example, the interface 130 of the water purification apparatus 100 outputs the guidance message according to the control command, for example, "For your safety, an amount of discharged hot water may be 100 ml or less" or you're your health, please discharge cold water to reduce an amount of drinking of ice water".

Further, when any one of the temperature of discharged water or the amount of discharged water, by the water purification module, is controlled according to the control command, the water may be discharged by the water purification module 110. In other words, 100 ml of hot water is discharged, and a greater amount of hot water may be discharged.

In this case, the controller 150 may control the water purification module 110 to stop the water discharge. Alternatively, when the water purification module 110 discharges the water according to the command and the water discharge, by the water purification module 110, is continuously requested, the communication unit 180 transmits, to the server 200, the information on discharged water including the state of the discharged water of the water purification module.

The embodiment in FIG. 4 may be applied according to a user who uses a water purification apparatus 100 or a temperature of water. As described in S13 to S15, a control processor 220 generates a control command to control the discharge of the water, which is performed by the water purification apparatus, based on at least one of the information on identification of the user (in the case of the elderly person) or the information on the object of the discharged water (the cold water/the hot water, and the like) and transmits the generated control command to the water purification apparatus.

Figure 5:
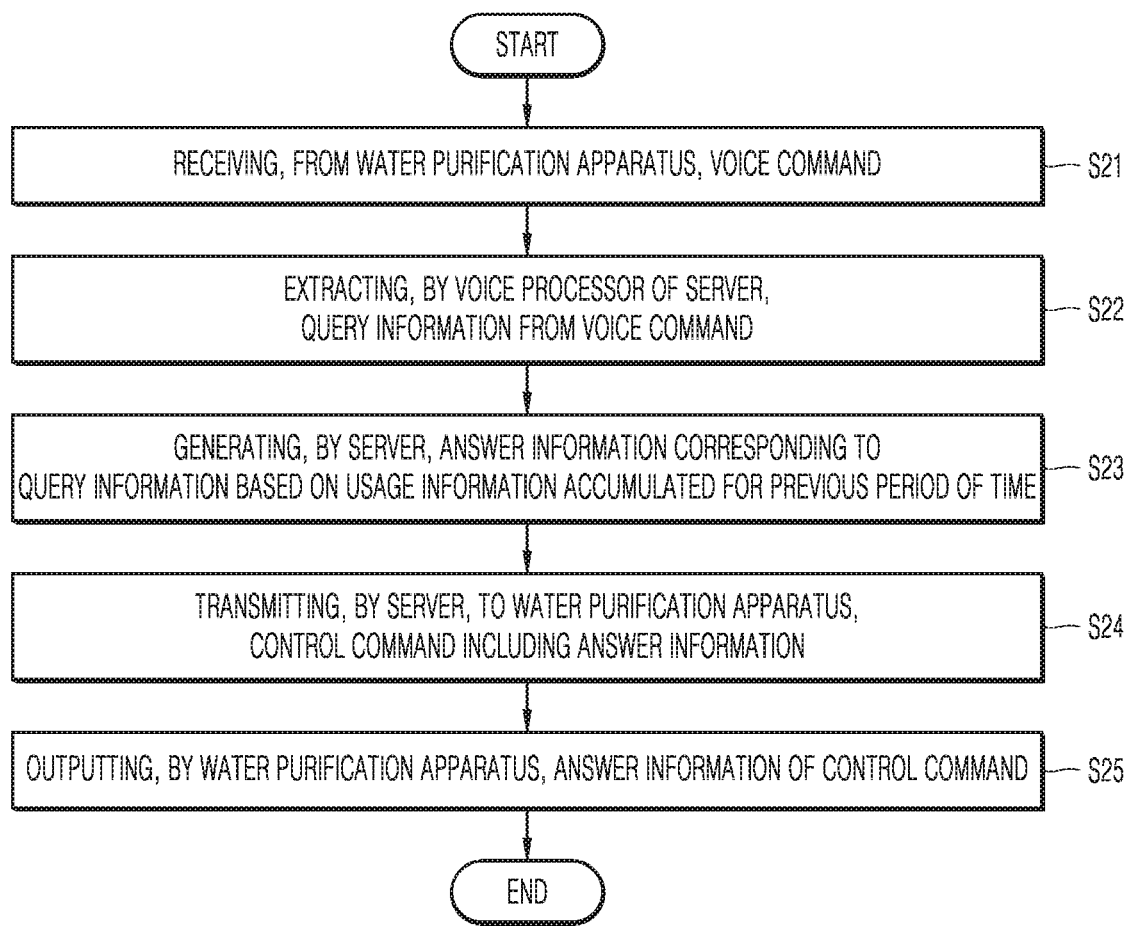
FIG. 5 shows a process of querying, by a user, to a water purification apparatus through voice according to an embodiment of the present disclosure.

FIG. 5 shows a process of querying, by a user, a water purification apparatus, through voice according to an embodiment of the present disclosure.

A user inputs a query with respect to using the water purification apparatus to a water purification apparatus 100 through voice. A voice input 120 of the water purification apparatus receives the query and transmits the voice command to a server 200. The server 200 receives a voice command from the water purification apparatus (S21), and a voice processor 210 of the server 200 extracts query information from the voice command (S22).

Thereafter, the server 200 generates answer information corresponding to the query information based on the information on use accumulated in a previous period of time. The information on use includes an amount drunk by each of members, a temperature of water, and information on an object of discharged water.

The server 200 transmits a control command including answer information to the water purification apparatus 100 (S24). An interface 130 of the water purification apparatus 100 outputs answer information included in the control command through voice or text (S25).

Figure 6:
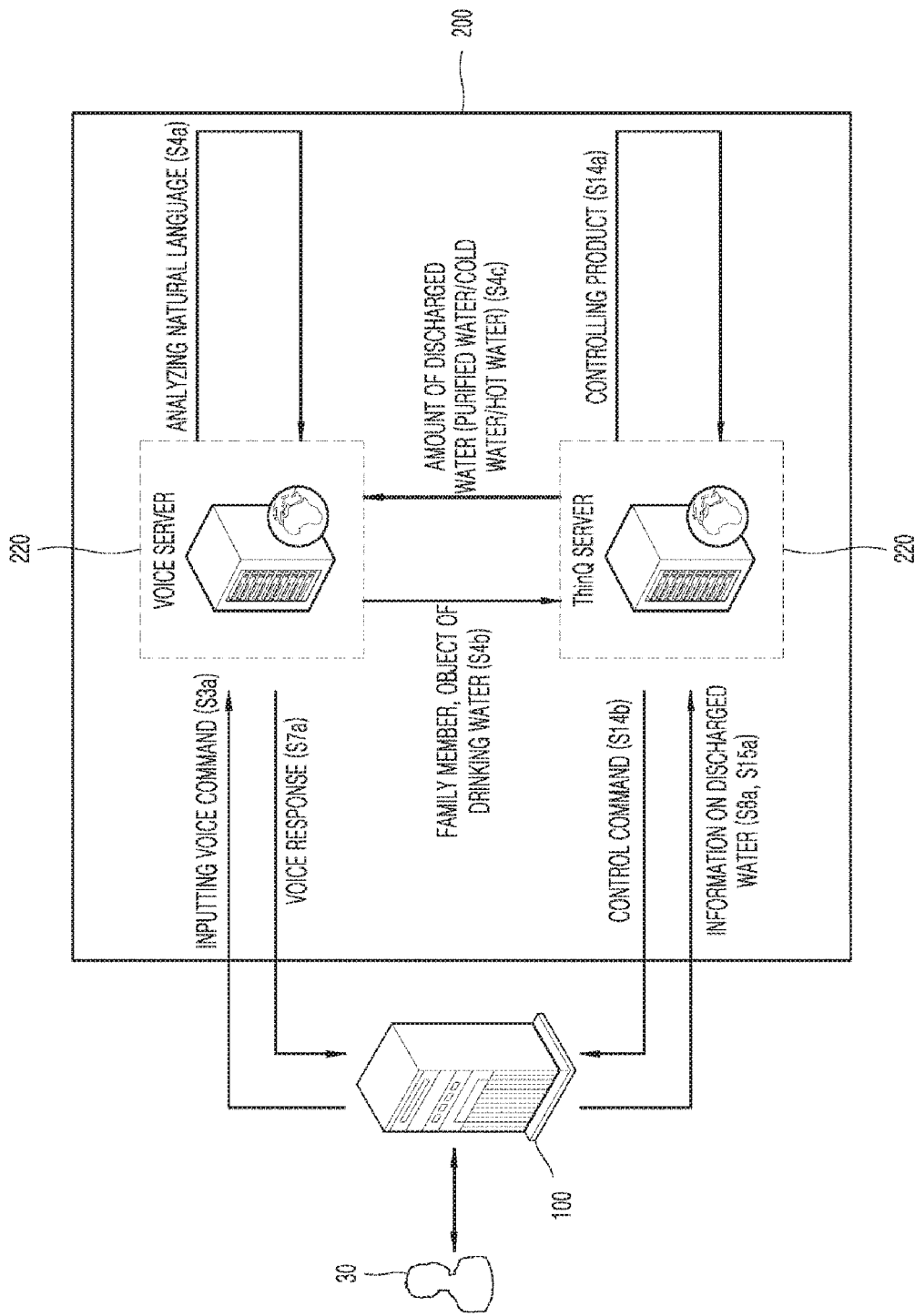
FIG. 6 shows a process of operating a water purification apparatus and a server according to an embodiment of the present disclosure.

FIG. 6 shows operations of a water purification apparatus and a server according to an embodiment of the present disclosure. Each apparatus may operate through the above-described processes. The voice command of the user 30 is inputted near a water purification apparatus 100 (S3a).

Examples of the input command include information on identification of a family member (for example, information on identification of a user who uses the water purification apparatus, for example, dad/mom or name), and information on the drinking water or the object of discharging the water (information on the object of discharging the water, drinking water, rice, coffee, and ramen).

Alternatively, the user may tell his or her identification information and may inquire about an amount of drinking water. The inquiry about the amount of drinking water includes request for information on the identification of the user and information on the amount of drinking water and the object of drinking water (for example, "please inform an amount of coffee mom drinks"). The voice processor 210 of the server 200 performs the natural language analysis with respect to the input voice command (S4a), and extracts information on the family member and the object of drinking, and provides the extracted information to the control processor 220 (S4b).

The control processor 220 generates the control command to control the product when the product is required to be controlled (for example, controlling the amount/temperature of discharged water of the water purification apparatus) based on the received information and transmit the generated control command to the water purification apparatus 100.

In particular, when the user identified by the voice processor 210 is a young child or an elderly person and young child or the elderly person discharges hot water, the control processor 220 may generate the control command to control the temperature of the discharged water, the speed of the discharged water, the amount of discharged water so that the water purification apparatus 100 may stably discharge the water. The water purification apparatus 100 may discharge the water according to the received control command.

When the water discharge is completed, the water purification apparatus 100 transmits, to the control processor 220, information on discharged water including the result of discharging the water (S8a and S15a). The result of discharging the water includes information on an amount of discharged water, the temperature of discharged water, or on stopping of discharging the water. Further, the information on the discharged water includes time information on a time point at which the water discharge starts, and time information on a time point at which the water discharge is completed.

Further, when the user queries the result of drinking water in S3a or the water discharge is finished in S8a and 515a, the control processor 220 may transmit the information on the discharged water to the voice processor 210 (S4c). The speech processor 210 transmits the received information to the water purification apparatus 100 with an audio file and the interface 130 of the water purification apparatus 100 outputs the audio file.

For example, the interface 130 of the water purification apparatus 100 may provide voice guidance such as "300 ml of hot water was used for cooking" or "Dad drank 300 ml of coffee today".

The control processor 220 receives, from the water purification apparatus 100, information on discharged water (an amount of discharged water, a temperature of discharged water, and a speed of discharged water) provided by the water purification apparatus, and stores the received information on discharged water. When information on use is received from the voice processor 210, information on discharged water for each user/each water purification apparatus is searched and extracted and the information is provided to the voice processor 210.

The voice command of the users input to the water purification apparatus 100 includes inquiring information on an amount of water drank according to family members, or classifying the amount of water drank according to the objects of drinking water, or inquiring information in combination of the two kinds of information.

Thus, information on identification of the family members is input to the voice command. Alternatively, the voice processor 210 may store information on characteristics of voice of each member. In this case, the user may not input information on identification of the user through voice, and inquire about the object of drinking the water, and the speech processor 210 compares the input voice with the stored information on the characteristics of the voice. The speech processor 210 may identify the user who inputs the voice.

The information included in the voice command includes information on identification of family member, kinds of water (hot water, purified water, and cold water), and a reference period of time (today, this week, for a month) required for checking the amount of water drank, to perform the natural language analysis.

Further, the information on discharged water, input by user, when the water is discharged by the water purification apparatus 100, may include powdered milk/coffee/green tea/ramen/cooking for drinking water (for intaking water).

Further, the user may inquire about the amount used according to the previous object of discharged water, for example, "please inform about an amount of coffee drunk" without inputting user information. In this case, the voice processor 210 may provide the water purification apparatus 100 with the information on the amount of discharged water, for coffee, by the water purification apparatus 100, for a certain period of time without distinguishing users.

Further, the control processor 220 may limit the amount of discharged water for each user and for the object of drinking water, by the water purification apparatus 100. For example, the control processor 220 may set the amount of discharged cold water to be 200 ml or less per day in the case of child based on information on limiting of discharged water, transmitted by the water purification apparatus 100 or a portable terminal 300.

In particular, the control processor 220 compares the information on discharged water received from the water purification apparatus 100 with the information on the object of the discharged water received from the voice processor 210 and the control processor 220 determines same usage from the compared information, the control processor 220 may store the information on identification of the user, the information on discharged water, and information on the object of discharged water, as the usage information.

For example, when the information on the object of discharged water is "hot water for coffee" and information on discharged water is "300 ml of hot water", the information on the object of discharged water is identical to the information on the discharged water, and the control processor 220 stores the information on identification of the user, the information on the discharged water, and the information on the object of the discharged water, as the usage information.

In another embodiment, when the information on the object of the discharged water is "hot water for coffee" and the information on the discharged water is "1 L of purified water", the information on the object of the discharged water is not identical to the information on the discharged water. In this case, the control processor 220 compares a time point at which the information on the discharged water is received from the water purification apparatus 100 or a time point at which the water is discharged, with a time point at which the information on the object of discharging the water is received from the voice processor 210.

As a result, when a time gap between the above-mentioned two time points is small (for example, 30 seconds or less), the control processor 220 may determine that usage of the identical person, and stores the usage information.

To the contrary, when the information on the object of the discharged water is different from the information on the discharged water and the control processor 220 compares a time point at which the information on the discharged water is received, by the control processor 220, or the time point at which the water is discharged, with the time point at which the information on the object of discharging the water is received from the voice processor 210, it may be determined that a time gap between the two time points is big (for example, 5 minutes or more). When the time gap between the two time points is big, the control processor 220 determines that different person may use the discharged water with different object, and stores the information on usage without additional information on identification of the user.

In particular, when the additional information on a time point at which the water discharge starts is not included in the information on the water discharge, the control processor 220 may identify the information on time through the following processes, to determine that the user is identical.

For example, it is assumed that a time point at which the voice processor 210 receives a voice command is a first time point, and a time point at which the control processor 220 receives the information on the discharged water is a third time point. The control processor 220 may generate a second time point at which the water purification apparatus 100 starts discharging the water based on an amount of discharged water corresponding to the information on the discharged water.

For example, when the time point at which the information on the discharged water is received is 3:15 PM and the amount of discharged water is 1 L, the control processor 220 may calculate the second time point in reverse by calculating time amount for which the water purification apparatus 100 discharges 1 L of water. The control processor 220 may match the information on the discharged water to the information on the identification of the user based on a time gap between the second time point and the first time point, thereby enhancing accuracy in identification of the user.

In this process, by using the time gap between the second time point and the first time point, the control processor 220 may match the information on the discharged water to the information on the identification of the user to determine a state in which the user who input the voice command uses a water purifier.

When the control processor 220 determines identical user's usage, but the information on the object of discharged water is not identical to the information on the discharged water, the control processor 220 converts the information on the object of the discharged water based on the information on the discharged water and stores the information on the object of the discharged water.

Figure 7:
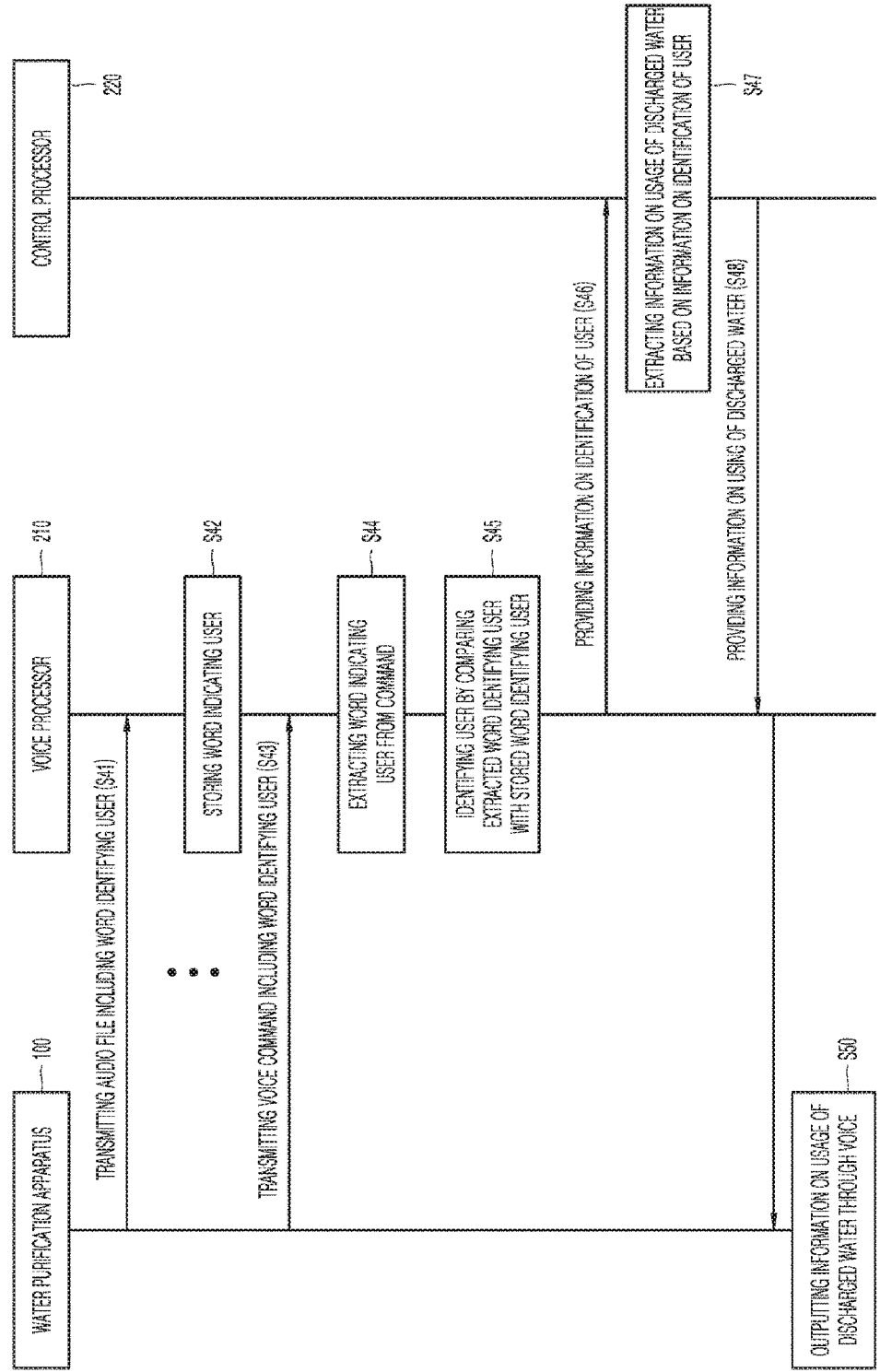
FIG. 7 shows a process of performing voice registration for user identification according to an exemplary embodiment of the present disclosure.

FIG. 7 shows a process of performing voice registration for user identification according to an exemplary embodiment of the present disclosure.

A water purification apparatus 100 directly receives, from a user, words of identifying the user for user registration and converts the input voice into an audio file and transmit the audio file to a voice processor 210 (S41). The voice processor 210 stores the words of identifying the user (S42). In this process, the voice processor 210 stores the words identifying the user and information on characteristic of voice corresponding to the words identifying the user.

For example, the voice processor 210 may store information on a frequency band, a speed of pronunciation with respect to the input voice, and feature point of the audio file, with the words identifying the user. Various kinds of words identifying the user may be input, for example, Yeong-mi/Cheol-soo/mom/dad/grandmother/grandfather.

Thereafter, the water purification apparatus 100 receives a voice command including words identifying the user and transmits the voice command to the voice processor 210 (S43). The voice processor 210 extracts words identifying the user from the voice command (S44). For example, the voice processor 210 may search for any identification words in the prior portion of the voice command, which is registered by the user, and may extract the words identifying the user.

Alternatively, even when there is no word identifying the user, the voice processor 210 may extract a voice feature from the voice of the voice command. The voice processor 210 compares the extracted words identifying the user with the stored words identifying the user and identifies the user (S45).

The voice processor 210 provides information on identification of the user to the control processor 220 (S46). The control processor 220 searches and extracts the information on use of discharged water based on the information on identification of the user (S47). This information is provided to the voice processor 210 (S48), and the voice processor 210 provides the water purification apparatus 100 with the information on use of the discharged water through the audio file (S49).

The water purification apparatus 100 outputs the information on using of discharged water through speech (S50).

Meanwhile, when the interface 130 of the water purification apparatus 100 includes a text-to-speech (TTS) module, the voice processor 210 or the control processor 220 may provide the water purification apparatus 100 with the information on using of discharge water through the text file.

The voice processor 210 transmits the information on the identified user to the control processor 220. The control processor 220 calculates the amount of water drank for each user and stores the amount of water drank. The control processor 210 transmits information on an actual amount of water drank (an amount of discharged water) to the voice processor 210 according to a request of the voice processor 210. The control processor 210 receives the amount of discharged water from the water purification apparatus 100.

In this process, the control processor 220 stores that the user identified based on the received information on identification of the user drinks an amount of water discharged by the water purification apparatus 100 during a predetermined period of time after a time point at which the information on identification of the user transmitted by the voice processor 210 is received.

For example, the voice processor 210 provides information on "Yeong-mi drinks cold water for cold coffee" at 3:35:25 to the control processor 220. Further, the water purification apparatus 100 transmits, to the control processor 220, the information on 250 ml of cold water discharged at 3:35:43.

The control processor 220 compares the information on identification of the user transmitted by the voice processor 210, the information on an object of use, and the information on an amount of discharged water/a temperature of discharged water transmitted by the water purification apparatus 100 and stores the information on "identification of user/kinds of water/object of discharged water/an amount of discharged water/a time point at which the water is discharged. For example, in the above example, the control processor 220 stores the information on "Yeong-mi/cold water/cold coffee/250 ml/15:35:43".

In another embodiment, after the voice processor 210 provides the control processor 210 with the information on "Yeong-mi drinks cold water for cold coffee" at 3:35:25, the water purification apparatus 100 transmits, to the control processor 220, the information on the 1500 ml of hot water discharged at 3:39:21.

In this case, the control processor 220 compares the information on identification of the user, the information on the object of use transmitted by the voice processor 210, and the information on discharged water transmitted by the water purification apparatus 100 (an amount of discharged water/a temperature of discharged water) and determines that the object of use or the amount of water transmitted by the voice processor 210 is different from an actual discharged water.

Further, as there is a time gap of 4 minutes between the time information transmitted by the voice processor 210 and the time point at which the water is discharged, the control processor 220 stores the information on the amount of discharged water and temperature of discharged water without additional kinds of received information on identification of the user with respect to the water purification apparatus 100.

Further, the control processor 220 may output a guide to drinking the water with regard to the cumulative amount used.

FIG. 7 is applicable when the user queries the amount of water previously drunk by the user. The control processor 220 extracts the information on using of discharged water corresponding to the query information of the voice command input by the user and provides the water purification apparatus 100 or the voice processor 210 with the information on the using of discharged water.

The information on using of the discharged water includes a cumulative amount of drinking water for a predetermined period of time. Further, the information on using of the discharged water may include subdivided information for each temperature. The control processor 220 may distinguish the amount of drinking water into an amount of cold water and an amount of hot water and may provide the information on using of the discharged water.

Figure 8:
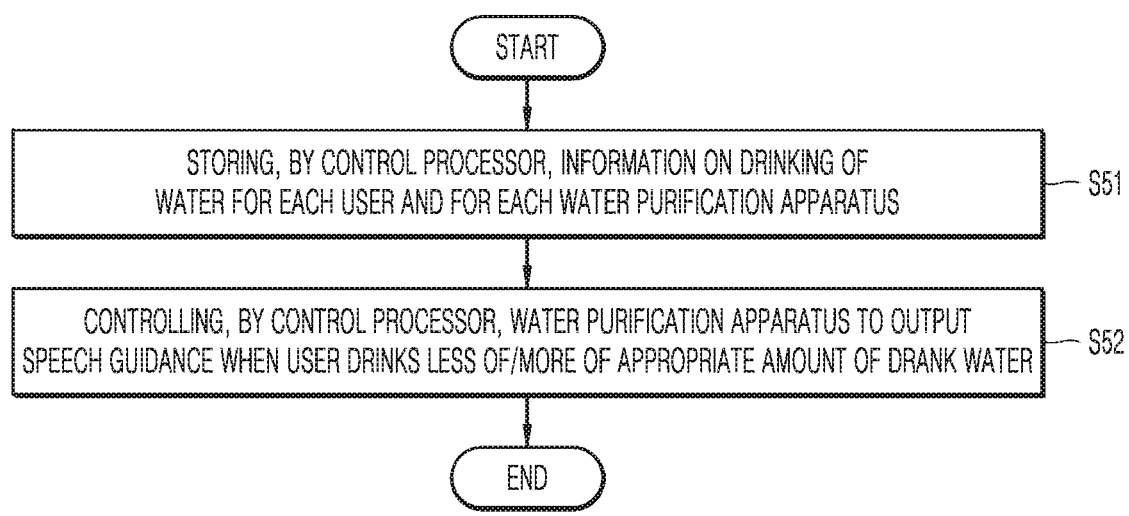
FIG. 8 shows a process of notifying, by a control processor, a user who uses a water purification apparatus, of information on drinking of water according to an exemplary embodiment of the present disclosure.

FIG. 8 shows a process of notifying, by a control processor, a user who uses a water purification apparatus, of drinking of water according to an embodiment of the present disclosure.

A control processor 220 stores information on using of discharged water, where the information relates to drinking the water for each user and for each water purification apparatus. Further, the control processor 220 controls the water purification apparatus 100 to output a speech guidance when the intake per user fall short or exceed the proper intake according to environmental factors, body factors, factors with respect to use habit.

Environmental factors may include seasons, weather, and the like. The body factor may be an appropriate amount of water drank per individual (weight). The factor of use habit are determined based on an amount of water which may be drunk by one person during a predetermined period of time. The amount of water drank by each user is monitored every hour and the water purification apparatus 100 may output the guidance when the user who has drank a large amount of water drinks again a large amount of water.

Factors of use habit may reflect information on activity of user. For example, when the user discharges the water to prepare a meal, the control processor 220 may store data on an average meal preparation time and a meal time to generate information on the meal time. Further, when the user discharges water during the meal time, the control processor 220 controls the water purification apparatus 100 to output the guidance of "please avoid drinking water during a meal.

The control processor 220 may receive information on season and weather from a server of the Meteorological Administration. Further, the control processor 220 may receive body information such as a weight corresponding to the information on identification of the user, from the water purification apparatus 10 or the mobile terminal 300.

Further, the control processor 220 may accumulate the amount of water drunk by each user.

The output of the speech guidance includes an embodiment in which the control processor 220 provides the speech to be output to the voice processor 210 and the voice processor 210 converts it into the audio file or the text file and transmits the converted audio file or text file to the water purification apparatus 100.

Further, the output of the speech guidance includes an embodiment in which the speech guidance output by the control processor 220 is converted into the text file and the converted text file is transmitted to the water purification apparatus 100.

FIG. 8 is summarized as follows. The control processor 220 extracts the daily cumulative amount of water drank based on the information on identification of the user and generates a message with respect to the notification of drinking of water. The control processor 220 provides the water purification apparatus 100 or the voice processor 210 with the generated message. The water purification apparatus 100 outputs a message before the water is discharged.

An example of a speech guidance message may include "an amount of water drunk by grandfather is less than an appropriate amount of water drunk". The embodiment in FIG. 8 may be applied in various manners. The water purification apparatus 100 and the server 200 may provide guide of an appropriate amount of drank water, a recommendation guide based on the information on the amount of water drunk for a period of time, a guide with respect to an amount of water drunk in consideration of meal time.

Figure 9:
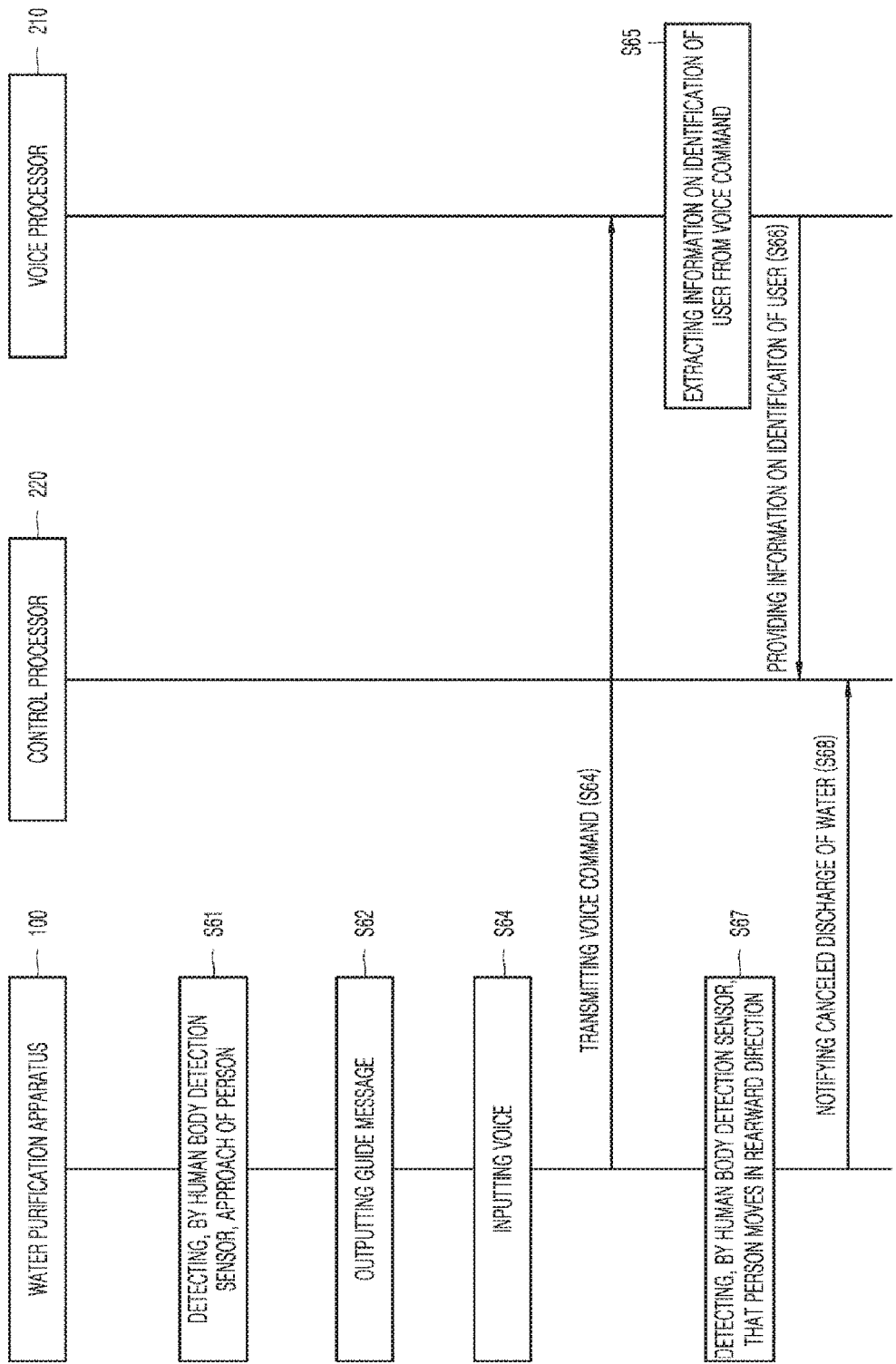
FIG. 9 shows a process in which a water purification apparatus detects movement of a user according to an embodiment of the present disclosure.

FIG. 9 shows a process in which a water purification apparatus detects movement of a user according to an embodiment of the present disclosure.

A human body detection sensor 140 of a water purification apparatus 100 senses approach of person (S61). An interface 130 outputs a guide message (S62). An example of a message may include "Who are you?" or "What kind of water would you like?", and the like.

When voice input of the user is received (S63), the water purification apparatus 100 transmits a voice command to the voice processor 210 (S64). The voice processor 210 extracts the information on identification of the user from the voice command (S65) and provides the control processor 220 with the information on identification of the user (S66).

Further, the human body detection sensor 140 of the water purification apparatus 100 detects that a person is moved in a rearward direction when the water is not discharged by the water purification module 110 (S67). This state refers that the water is not discharged, according to the input voice.

Therefore, a communication unit 180 of the water purification apparatus 100 notifies the control processor 220 that the water discharge has been canceled. In this case, the control processor 220 may delete the previously received information on identification of the user.

In the embodiment in FIG. 9, after the water purification 100 receives a voice, the communication unit 180 of the water purification apparatus 100 transmits, to a server 200, an audio file in which the voice is stored and the human body detection sensor senses that the person is moved in the rearward direction without the water discharge, by the water purification module 100, the server 200, in particular, the control processor 200 is notified of the cancelled discharging of water, to resolve a problem of incorrectly identifying the user.

When embodiments of the present disclosure are applied, the water purification apparatus 100 and the server 200 may be notified of family member/an object of drinking water by performing the function for recognizing the voice of the water purification apparatus 100 and the voice processor 210 and the user may inquire about the same and may be notified of the family member/the object of drinking water.

When embodiments of the present disclosure are applied, the voice processor 210 identifies the family members and the object of drinking included in the voice command. The control processor 220 may provide the water purification apparatus 100 with information on the amount of drank water of each user.

Further, the control processor 220 may provide the portable terminal 300 with the information on the discharged water or the information on using of discharged water and the user may determine the state of using of the water purification apparatus 100 regardless of places.

The voice processor 210 distinguishes two or more keywords in the voice command and identifies whether a particular keyword is a reference keyword used to distinguish the user (the family member).

Further, the control processor 220 may calculate an amount of drank water for each user based on the reference keyword and may transmit the information on using of discharged water to the water purification apparatus 100, and may manage the amount of water discharged by the water purification apparatus 110.

Although components included in the exemplary implementation of the present disclosure are described as being combined to one, or as being coupled to operate, such exemplary implementation is not necessarily limited to this specific example, and these components can be selectively combined to one or more and coupled to operate within the purpose range of the present disclosure. Further, although all of the components may be implemented as an independent hardware, a part or all of each of the components may be selectively combined and implemented as a computer program that has a program module to perform a part or all of the functions combined in one or a plurality of hardwares. Codes and code segments that are included in the computer program may be easily deduced by those skilled in the art of the present disclosure. The computer program may be stored in computer readable media that a computer can read, and may be read and implemented by the computer, so as to implement the present disclosure. The storage medium of the computer program may include a storage medium including a semiconductor recording element, an optical recording medium, a magnetic recording medium. Further, the computer program that implements the embodiment of the present disclosure may include a program module that is transmitted in real time through an external apparatus.

While the present disclosure has been mainly described referring to the exemplary implementation of the present disclosure hereinabove, various modifications and changes can be made at the level of those skilled in the art. Therefore, unless such a modification and change do not deviate from the range of the present disclosure, it will understand that they are included in the scope of the present disclosure.

What is claimed is:

1. A server for monitoring a water purification apparatus according to a voice command, the server comprising:
a voice processor configured to receive the voice command from the water purification apparatus and identify a user who issues the voice command;
a control processor configured to receive information on discharged water from the water purification apparatus and match the information on the discharged water to information on identification of the user and store the information on the discharged water and the information on identification of the user; and
a communication unit configured to transmit and receive data to and from the water purification apparatus,
wherein a time point at which the voice processor receives the voice command is a first time point,
wherein a time point at which the control processor receives the information on the discharged water is a third time point,
wherein the control processor is further configured to:
generate a second time point at which the water purification apparatus starts discharging the water based on an amount of discharged water corresponding to the information on the discharged water;
match the information on the discharged water to the information on identification of the user based on a time gap between the second time point and the first time point; and
calculate the second time point in reverse by calculating a time amount for which the water purification apparatus discharges the water.

2. The server of claim 1, wherein the voice processor is configured to instruct, when the information on identification of the user is missing from the voice command, the water purification apparatus to output a guidance message to request an input of the information on identification of the user.

3. The server of claim 1, wherein the voice processor is configured to receive the voice command from the water purification apparatus and extract the information on identification of the user and query information, and information on an object of the discharged water, from the voice command.

4. The server of claim 3,
wherein the voice processor is configured to receive information on identification of the user or an audio file from the water purification apparatus or a portable terminal, and
wherein the voice processor is configured to extract information on a characteristic of voice, from the audio file, and store the extracted information on the characteristic of the voice with the information on identification of the user.

5. The server of claim 3, wherein the control processor is configured to compare the information on the discharged water with the information on the object of the discharged water, and when it is determined that the discharged water corresponding to the information on the discharged water and the discharged water corresponding to the information on the object of the discharged water have same purpose, the control processor is configured to store the information on identification of the user and the information on the discharged water, and the information on the object of discharged water.

6. The server of claim 1,
wherein the control processor is configured to match the information on identification of the user based on the time gap between the second time point and the first time point, and
wherein the control processor is configured to convert, when the information on the object of the discharged water is not identical to the information on discharged water, the information on the object of the discharged water and store it.

7. The server of claim 3, wherein the control processor is configured to extract information on using of the discharged water corresponding to the query information and provide the water purification apparatus or the voice processor with the extracted information on using of the discharged water.

8. The server of claim 1,
wherein the control processor is configured to extract a cumulative amount of drank water per day based on the information on identification of the user and generate a message with respect to a notification of drinking of water, and provide the water purification apparatus or the voice processor with the generated message, and
wherein the water purification apparatus is configured to output the message before the water is discharged.

9. The server of claim 3, wherein the control processor is configured to generate a control command to control the discharge of the water of the water purification apparatus, based on any one of the information on identification of the user or the information on the object of the discharged water and transmit the generated control command to the water purification apparatus.

10. A water purification apparatus operating according to a voice command, the water purification apparatus comprising:
- a water purification module configured to discharge water;
- a voice input configured to receive voice;
- an interface configured to output an audio file or a text through voice;
- a communication unit configured to transmit and receive data to and from a server and transmit information on discharged water, discharged by the water purification module, to the server;
- a controller configured to control the water purification module according to a control command received from the server; and
- a human body detection sensor configured to detect a movement of a person in front, wherein when the human body detection sensor senses approach of the person, then the interface outputs a guide message, and wherein, after the water purification apparatus receives the voice and the communication unit transmits, to the server, an audio file in which the voice is stored, when the human body detection sensor detects that a person is moved in a rearward direction without discharging the water by the water purification module, the communication unit is configured to notify the server that the water discharge is canceled.

11. The water purification apparatus of claim 10,
wherein the control command is configured to control any one of a temperature of discharged water or an amount of water discharged by the water purification module, and wherein the communication unit is configured to transmit, when the water purification module discharges the water according to the command and the water discharge performed by the water purification module is continually requested, the information on discharged water comprising a state in which the water is discharged by the water purification module to the server.

* * * * *